United States Patent
Mangal et al.

(10) Patent No.: US 11,868,206 B2
(45) Date of Patent: Jan. 9, 2024

(54) AUTOMATED MASS MESSAGE PROCESSING

(71) Applicant: SAP SE, Walldorf (DE)

(72) Inventors: Hemant Mangal, Bangalore (IN);
Mohit V Gadkari, Bangalore (IN);
Arpit Jaiswal, Bangalore (IN); Divya Arun Patil, Bangalore (IN);
PankajKumar Agrawal, Bangalore (IN); Mukesh Kumar, Bangalore (IN);
Pooja Ramarathnam, Bangalore (IN);
Bhavya Jha, Bangalore (IN)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 17/355,870

(22) Filed: Jun. 23, 2021

(65) Prior Publication Data

US 2022/0365840 A1  Nov. 17, 2022

(30) Foreign Application Priority Data

May 11, 2021  (IN) .............................. 202111021213

(51) Int. Cl.
*G06F 11/00* (2006.01)
*G06F 11/07* (2006.01)
(Continued)

(52) U.S. Cl.
CPC .......... *G06F 11/0793* (2013.01); *G06F 9/546* (2013.01); *G06F 11/079* (2013.01);
(Continued)

(58) Field of Classification Search
CPC .. G06F 11/0793; G06F 9/546; G06F 11/0751; G06F 11/0769; G06F 11/079; G06F 11/1438
See application file for complete search history.

(56) References Cited

U.S. PATENT DOCUMENTS

| | | | | |
|---|---|---|---|---|
| 5,396,616 | A * | 3/1995 | Venable | G06F 9/544 718/107 |
| 6,516,021 | B1 * | 2/2003 | Abbott | G01S 19/26 375/150 |

(Continued)

OTHER PUBLICATIONS

U.S. Appl. No. 17/093,963, Nandanwar et al., filed Nov. 10, 2020.

*Primary Examiner* — Loan L. T. Truong
(74) *Attorney, Agent, or Firm* — Fish & Richardson P.C.

(57) ABSTRACT

The present disclosure involves systems, software, and computer implemented methods for automated message processing. Information associated with a failure message generated in response to process integration failure between two computer-implemented applications is received. The two computer-implemented applications include a sender application and a receiver application. The information includes a sender application/receiver application interface and details that caused the failure. Using the received information, multiple failure message similar to the failure message are identified. The identified messages were generated in response to the same process integration failure between the two computer-implemented applications. For either the sender or the receiver application, a resolution class operation executable to rectify the process integration failure is identified. The resolution class operation is simultaneously executed for all of the multiple failure messages.

18 Claims, 6 Drawing Sheets

(51) Int. Cl.
*G06F 9/54* (2006.01)
*G06F 11/14* (2006.01)

(52) U.S. Cl.
CPC ...... *G06F 11/0751* (2013.01); *G06F 11/0769* (2013.01); *G06F 11/1438* (2013.01)

(56) References Cited

U.S. PATENT DOCUMENTS

| | | | |
|---|---|---|---|
| 7,702,966 B2* | 4/2010 | Chandwani | G06F 11/0793 714/47.1 |
| 8,732,083 B2 | 5/2014 | Seubert et al. | |
| 8,732,668 B2* | 5/2014 | Klemenz | G06F 11/0793 717/109 |
| 8,880,668 B2* | 11/2014 | Ebrahimi | G06F 11/3055 714/25 |
| 9,135,585 B2 | 9/2015 | Bader et al. | |
| 9,146,798 B2* | 9/2015 | Gupta | G06F 11/0763 |
| 9,183,074 B2* | 11/2015 | Michel | G06F 11/0793 |
| 9,754,000 B2 | 9/2017 | Kreindlina et al. | |
| 10,108,473 B2* | 10/2018 | Jhunjhunwala | G06F 11/0781 |
| 10,423,427 B1* | 9/2019 | Hayward | G06F 9/44505 |
| 10,740,216 B1* | 8/2020 | Parent | G06N 20/20 |
| 10,812,409 B2 | 10/2020 | Tiwary et al. | |
| 10,990,639 B2 | 4/2021 | Kumar et al. | |
| 2004/0153833 A1* | 8/2004 | Deacon | G06F 11/0727 714/38.14 |
| 2005/0259590 A1* | 11/2005 | Brown | H04Q 3/62 370/250 |
| 2006/0090097 A1* | 4/2006 | Ngan | G06F 11/2002 714/6.12 |
| 2006/0098678 A1* | 5/2006 | Tan | H04W 12/033 370/441 |
| 2006/0247945 A1* | 11/2006 | Cummings | G06Q 10/06 718/102 |
| 2007/0074225 A1* | 3/2007 | Viertola | G06F 9/546 719/313 |
| 2008/0214299 A1* | 9/2008 | Smith | G07F 17/32 463/43 |
| 2010/0082497 A1 | 4/2010 | Biesemann et al. | |
| 2011/0252269 A1* | 10/2011 | Fabbrocino | G06F 11/0742 714/2 |
| 2011/0307263 A1 | 12/2011 | Bader et al. | |
| 2012/0047079 A1 | 2/2012 | Biesemann et al. | |
| 2012/0137306 A1* | 5/2012 | Sarferaz | G06Q 10/10 719/315 |
| 2013/0111277 A1* | 5/2013 | Klemenz | G06F 11/0793 714/57 |
| 2014/0181145 A1* | 6/2014 | Kamsamohideen | G06F 11/0793 707/776 |
| 2014/0380105 A1* | 12/2014 | Michel | G06F 11/0709 714/57 |
| 2015/0363192 A1* | 12/2015 | Sturtevant | G06F 8/71 717/131 |
| 2016/0048790 A1* | 2/2016 | Ritter | G06Q 10/10 705/7.26 |
| 2016/0232042 A1* | 8/2016 | Ritter | G06F 8/427 |
| 2016/0371133 A1* | 12/2016 | Jhunjhunwala | G06F 11/0769 |
| 2017/0161138 A1* | 6/2017 | Oleynikov | H04L 69/40 |
| 2019/0079818 A1* | 3/2019 | Handa | G06F 11/0778 |
| 2019/0095317 A1* | 3/2019 | Palanisamy | G06F 11/0706 |
| 2019/0370104 A1* | 12/2019 | Wignarajah | G06F 11/0715 |
| 2020/0125620 A1 | 4/2020 | Kumar et al. | |
| 2020/0249914 A1* | 8/2020 | Bragdon | G06F 8/35 |
| 2021/0216343 A1* | 7/2021 | Dolby | G06F 11/3006 |
| 2021/0349739 A1* | 11/2021 | Ritter | G06F 8/10 |
| 2022/0147414 A1* | 5/2022 | R | G06F 11/0778 |

* cited by examiner

FIG. 3

Function Builder: Display FM_AMP_RESOLVE

Function module: FM_AMP_RESOLVE  Active

Tabs: Attributes | Import | Export | Changing | Tables | Exceptions | Source code

| Parameter Name | Typi.. | Associated Type | Default Value | Op... | Pa... | Short text |
|---|---|---|---|---|---|---|
| IV_MSGID | TYPE | SRT_MSGID | | ☐ | ☑ | Message ID in SOAP Runtime |

Communication Monitoring Work Center

Messages with Errors ▶

View | Export | New | Mark as Complete | Mark as Pending | Restart | Cancel | Find Resolution | Search | Refresh List | »

502

| Status | Document ID | Business Document | Direction | Operation |
|---|---|---|---|---|
| | | | | |
| | | | | |

500

Dictionary: Display Table

| Transp. Table | AMP_S_EXIT_REG | Active |

Short Description: Automated Message Processing - Application Exit Registration

/ Attributes / Delivery and Maintenance / Fields / Entry help/check / Currency/Quantity Fields /

Srch Help | Predefined Type

| Field | Key | Ini... | Data element | Data Type | Length | Deci... | Short Description |
|---|---|---|---|---|---|---|---|
| IB_INTERFACE | ☑ | ☑ | SRT_INTERFACE_N... | CHAR | 120 | 0 | Interface Name |
| OB_INTERFACE | ☑ | ☑ | SRT_INTERFACE_N... | CHAR | 120 | 0 | Interface Name |
| T100_AREA | ☑ | ☑ | ARBGB | CHAR | 20 | 0 | Application Area |
| T100_MSGNO | ☑ | ☑ | MSGNR | CHAR | 3 | 0 | Message number |
| CLASSNAME | ☐ | ☐ | SEOCLSNAME | CHAR | 30 | 0 | Object Type Name |
| RESOLUTION | ☐ | ☐ | AMP_RESOLUTION_... | CHAR | 1 | 0 | Resolution strategy for automated message processing |
| TASK_RESOLUTION... | ☐ | ☐ | AP_STRING | STRING | 0 | 0 | String |

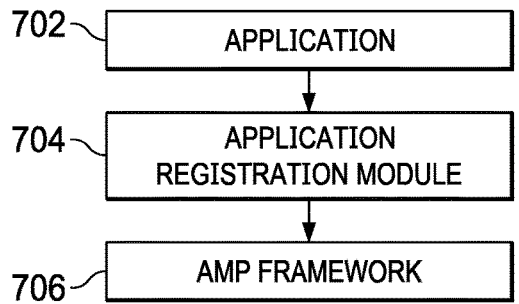
FIG. 7
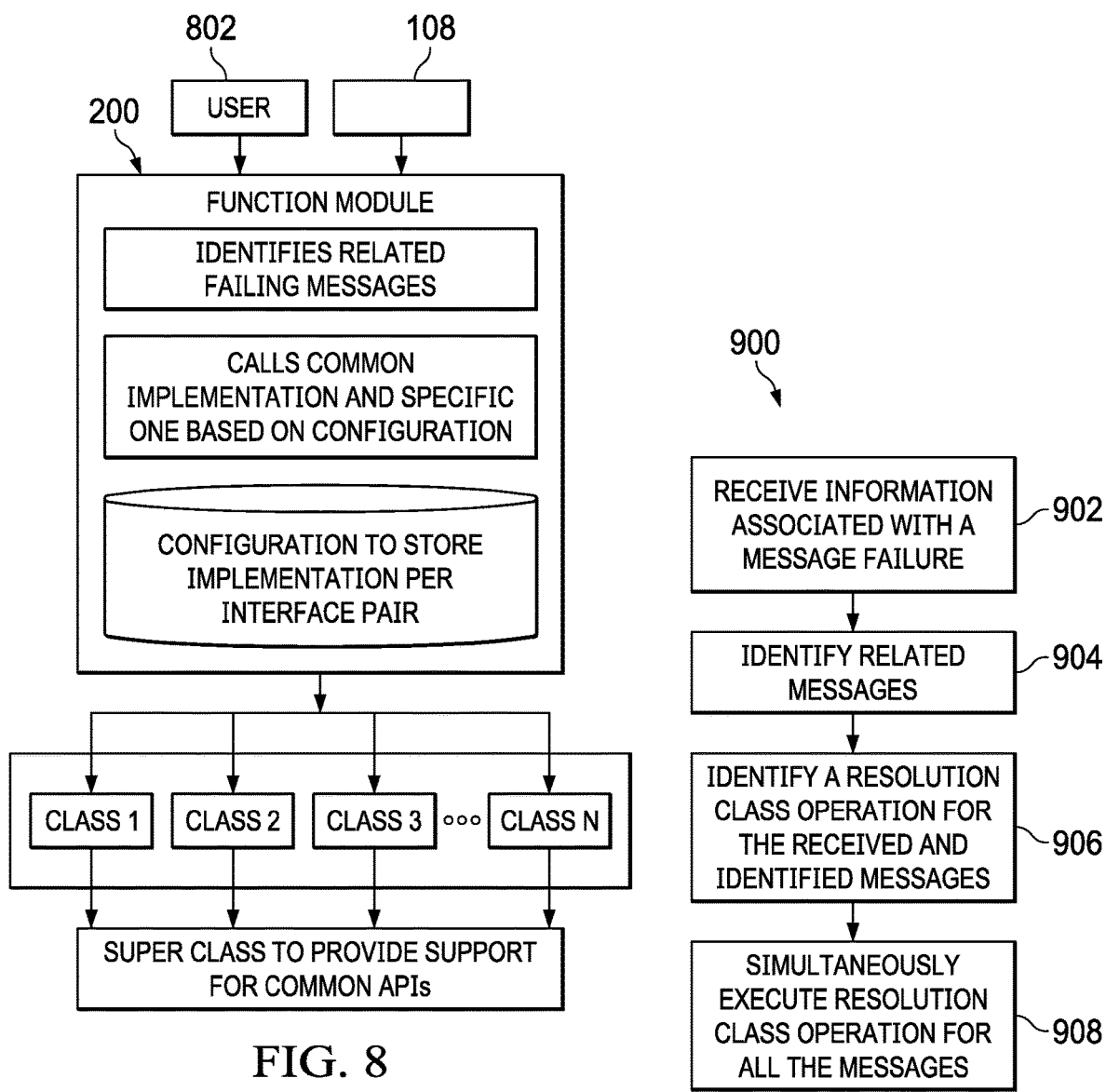
FIG. 8
FIG. 9

AUTOMATED MASS MESSAGE PROCESSING

CLAIM OF PRIORITY

This application claims priority under 35 USC § 120 to India Patent Provisional Application No. 202111021213, filed on May 11, 2021, the entire contents of which are hereby incorporated by reference.

TECHNICAL FIELD

The present disclosure to computer-implemented methods, software and systems for managing messages between computer processes.

BACKGROUND

In computing environments such as enterprise solutions (e.g., ERPs), computer-implemented processes (e.g., business processes) exchange messages, e.g., process integration messages, with each other. Sometimes, process integration fails and a failure message is generated. In such instances, the root cause of the failure needs to be rectified to allow future process integration to execute as intended. Rectifying failure can include operations such as restarting the computer-implemented processes that attempted the process integration. If restarting the processes does not rectify the failure, then a development team may need to be engaged to review the processes and implement rectification measures such as patches. In parallel, the failure message, which identified the failure to begin with, also needs to be processed. If process integration fails multiple times, then multiple failure messages are generated and the number of failure messages may be large (e.g., in the order of millions of messages). The ability to process a large number of failure messages automatically (i.e., without or with minimal human intervention) and in bulk would be beneficial.

SUMMARY

The present disclosure describes automated mass message processing.

Certain aspects of the subject matter described here can be implemented as a computer-implemented method. Information associated with a failure message generated in response to process integration failure between two computer-implemented applications is received. The two computer-implemented applications include a sender application and a receiver application. The information includes a sender application/receiver application interface and details that caused the failure. Using the received information, multiple failure message similar to the failure message are identified. The identified messages were generated in response to the same process integration failure between the two computer-implemented applications. For either the sender or the receiver application, a resolution class operation executable to rectify the process integration failure is identified. The resolution class operation is simultaneously executed for all of the multiple failure messages.

An aspect combinable with any other aspect includes the following features. The resolution class operation is an application exit operation. To identify, for either the sender or the receiver application, the resolution class operation, a registration table for the application exit operation is looked up. Either the sender or the receiver application can have registered the application exit operation in the registration table. To simultaneously execute the application exit operation for all of the multiple failure messages, the application exit operation is identified in the registration table, and the application exit operation is simultaneously triggered for all of the multiple failure messages.

An aspect combinable with any other aspect includes the following features. After simultaneously executing the resolution class operation for all of the multiple failure messages, it is determined that the resolution class operation was unsuccessful, and, in response to doing so, a notification of the unsuccessful execution is forwarded to an application development team.

An aspect combinable with any other aspect includes the following features. The resolution class operation for either the sender or the receiver application is searched. In response to not finding the resolution class operation for either the sender or the receiver application, a generic resolution operation common to all applications is identified. The generic resolution is executable to rectify the process integration failure. The generic resolution operation is simultaneously executed for all of the multiple failure messages.

An aspect combinable with any other aspect includes the following features. The generic resolution is a restart of all the applications.

An aspect combinable with any other aspect includes the following features. The generic resolution is a restart of either the sender or receiver applications.

An aspect combinable with any other aspect includes the following features. To receive the information associated with the failure message, an object is displayed in a user interface. The object is selectable to transmit the information. In the user interface, a message identifier identifying the failure message is displayed. A selection of the message identified followed by a selection of the object is identified.

An aspect combinable with any other aspect includes the following features. The information associated with the process integration failure includes a sender application identifier, a receiver application identifier and a message identifier.

An aspect combinable with any other aspect includes the following features. It is determined that a number of the multiple failure messages exceeds a threshold number of failure message for which the resolution class operation is simultaneously executable. In response to doing so, a subset is identified from among the multiple failure messages. A number of failure messages in the subset equals the threshold number of failure messages. In a first operation execution cycle, the resolution class operation is executed simultaneously for all of the failure messages. In a subsequent operation execution cycle, the resolution class operation is simultaneously executed for all of the failure messages in a remainder of the multiple failure messages.

While generally described as computer-implemented software embodied on tangible media that processes and transforms the respective data, some or all of the aspects may be computer-implemented methods or further included in respective systems or other devices for performing this described functionality. The details of these and other aspects and implementations of the present disclosure are set forth in the accompanying drawings and the description below. Other features, objects, and advantages of the disclosure will be apparent from the description and drawings, and from the claims.

BRIEF DESCRIPTION OF THE DRAWINGS

FIG. 3 is an example of a function builder table.

FIG. 4 is an example of a registration table.

FIG. 5 is an example of a communication monitoring work center.

FIG. 7 is a schematic diagram of an example of a cleanup of unprocessed messages via silent data migration.

FIG. 8 is a schematic diagram of an example of modularization of automatic message processing.

FIG. 9 is a flowchart of an example of a process of automatically processing failed messages.

Like reference numbers and designations in the various drawings indicate like elements.

DETAILED DESCRIPTION

Figure 1:
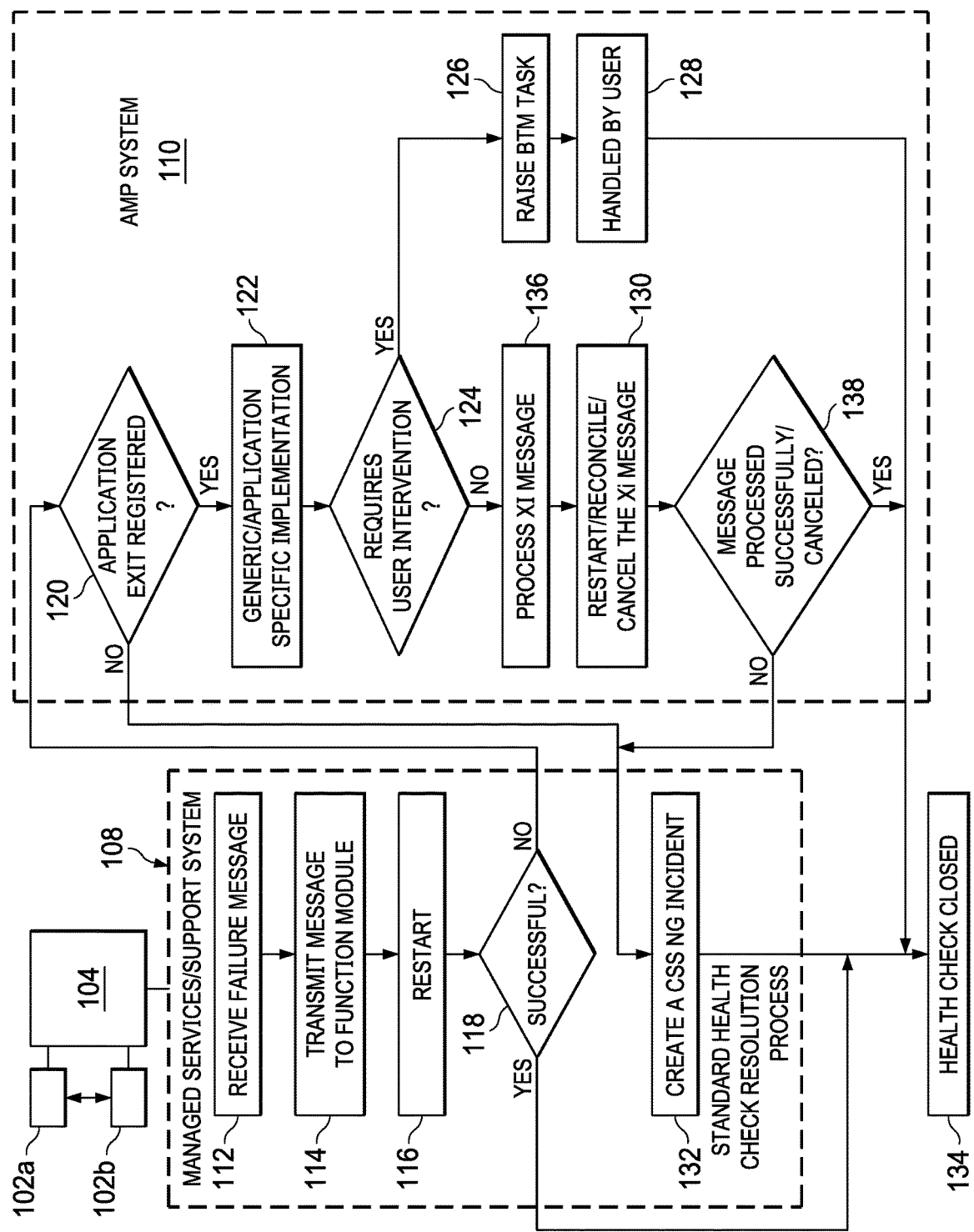
FIG. 1 is a schematic diagram of an example of a system to handled incidents related to failed process integration messages.

Enterprises and other companies can deploy a variety of software solutions (e.g., ERP solutions) to manage organizational processes. The organizational processes can be computer-implemented methods and systems that deploy applications, which, when executed, implement process integration. That is, one computer-implemented process seamlessly integrates with another, different computer-implemented process to perform operations. The process integration can include exchange of information (e.g., data) between a sender application and a receiver application. In a given time interval, the applications may exchange information multiple times.

Sometimes, the process integration fails, e.g., data sent from the sender application is not received by the receiver application. When the process integration fails, a failure message identifying the failure is generated. In some instances, the applications can be configured to continue future process integration attempts despite that one instance of failure. If future attempts also fail, then a failure message is generated for each such failure.

To rectify the failure and to ensure that future process integration executes as intended, a resolution operation is implemented on either the sender or the receiver application (or both). For example, the application is either restarted or canceled. If neither operation rectifies the failure, then an incident is raised for an application development team (e.g., the team that developed either the sender or the receiver application or both) to more closely review the reason for failure. In some instances, the application development team periodically deploys health checks across the applications to identify such failures, e.g., to look for failure messages. In instances in which the process integration operations execute despite an earlier failure, failure messages can continue to be generated for each attempt. In some instances, the number of failed messages can range in the millions. Even if the development team rectifies the error via a patch or other fix for a failure that resulted in one failure message, the development team needs to take manual action to address the failures that resulted in previously-generated failure messages.

This disclosure describes computer-implemented methods, systems and computer program product to add intelligence to the resolution of such failure messages in an automated way with the capability of mass processing, i.e., to simultaneously implement a resolution to address a large number of failure messages. This disclosure also describes an automated mass message processing (AMP) framework that can investigate details of failed process integration messages and make resolution proposal or take corrective measures accordingly. Implementing the techniques described in this disclosure can save time to resolve failure messages. Operators of the support system (described below) need not log-in each time a failure message is received and manually resolve the failure message. The framework described in this disclosure can find a resolution for such failed messages and save time and resources otherwise consumed by application support and development teams. The burden of resolving at least some failure messages is transferred from the application support and development teams to the application user. Not only does doing so enable the application user to resolve the failure message, but also the computer resources consumed by exchange of details of the failure messages between the application user and the application development and support teams is reduced, thereby increasing available computer resources and network bandwidth. Once the application development fixes a problem which was causing high volume of failed messages, cleanup of existing failed messages would be required. The AMP framework described in this disclosure can provide the application with registration capability by which all the cleanup activities can be performed centrally for all use cases from application areas.

Some techniques to process failure messages include health check processing. In health check processing, computer-implemented monitoring jobs run periodically for certain intervals to monitor the health of the applications that are communicating with each other. In this context, "health" means whether the application is operating as intended and, specifically, if the process integration between applications is executing as intended. Sometimes, the application encounters an error causing failure of process integration and causing generation of a failure message. In such instances, the health check processing system creates health check incidents automatically and processes the incidents. To do so, the health check processing system first checks if the error can be resolved, i.e., if computer-implemented operations can be performed to resolve the error. If yes, the health check processing implements those operations. If no, then the health check processing system creates an incident report and moves the incident report either to the application support team or the application development team. The teams analyze and implement a resolution to resolve the error and to avoid future errors of the same type.

FIG. 1 is a schematic diagram of an example of a system to handled incidents related to multiple failure messages. The description below identifies several components including systems, applications and modules. Each component can be implemented as a computer system that implements or deploys a computer program product. Each computer program product can be encoded on a storage medium (e.g., a non-transitory storage medium) and can include computer readable instructions (e.g., non-transitory computer-readable instructions) for causing one or more processors to perform operations described here.

FIG. 1 shows an example of a computing environment, e.g., an enterprise, in which two applications (a first application 102*a* and a second application 102*b*) are operatively coupled to each other and to a health check processing system 104 via one or more networks (not shown). The two applications exchange information to implement process integration. As described earlier, process integration failure results in a failure message. The health check processing system 104 is configured to identify such failure messages and, in response to identifying such a failure message, to transmit an alert. The alert remains open until the root cause of the process integration failure has been rectified.

In some implementations, the alert transmitted by the health check processing system 104 is received by a managed services/support system 108 (support system 108), which is configured to resolve/rectify the error that caused the process integration failure that resulted in the failure message. At 112, the support system 108 receives the failure message from the health check processing system 104. At 114, the support system 108 forwards the failure message to a function module 200 (described with reference to FIG. 2). The function module 200 handles the failure message as described below. At 116, the support system 108 restarts either or both of the applications 102a or 102b in an attempt to rectify the process integration failure. At 118, the support system 108 checks if the restart was successful in rectifying the process integration failure. If yes, the support system 108 transmits a successful rectification notice to the health check processing system 104, which closes the alert originally generated in response to the process integration failure.

If the support system 108 determines that the restart was unsuccessful, then, at 120, then the automated mass message processing (AMP) system 110 attempts to rectify the process integration failure and to process the failure message. At 120, the AMP system 110 checks if either of the applications has registered an application resolution operation. If the application resolution operation has not been registered, then, at 132, an incident is created and, for example, forwarded to the application development team for resolution. In some implementations, the AMP system 110 registers an application resolution class operation for each application in the enterprise, especially for each application that implements process integration. The application resolution class operation is an operation or collection of operations that the AMP system 110 can implement on an application to rectify the process integration failure. For example, the application resolution class operation can include an application exit operation or an application restart operation. The application resolution class operation can be specific to an application or can be generic to all classes. As described below, the AMP system 110 first looks for an application-specific resolution class operation and then looks for a generic resolution class operation executable on all applications involved in the process integration.

At 122, the AMP 110 confirms that either an application-specific resolution class operation or a generic resolution class operation is available. At 124, the AMP 110 checks if the resolution class operation needs permission from a user of the application before it can be executed on the application. If yes, then at 126, the AMP 110 generates a business task manager (BTM) task message and transmits the message to the user of the application. The message can include the resolution class operation to be performed. At 128, the user of the application handles implementing the resolution class operation. If, at 124, the AMP system 110 determines that user intervention is not required, then, at 136, the AMP system 110 processes the failure message. To do so, at 130, the AMP system 110 implements the resolution class operation which can be to restart/reconcile/cancel the application and in addition can contain application specific logic. After implementing the resolution class operation, at 138, the AMP system 110 checks if the message has been processed successfully or cancelled. If the message has been processed successfully, then, at 134, the health check is closed. Otherwise, at 132, an incident is created and, for example, forwarded to the application development team for resolution.

Figure 2:
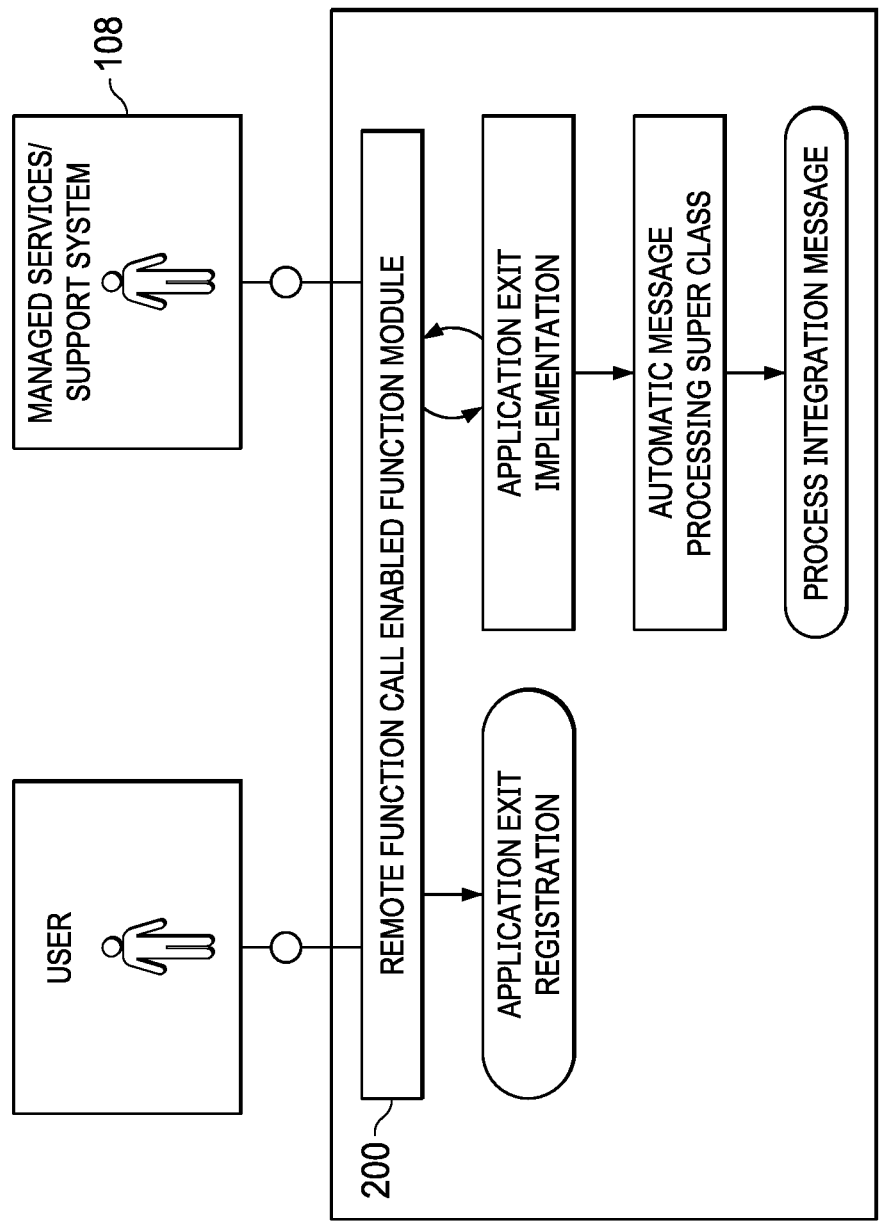
FIG. 2 is a schematic diagram of an example of a system depicting an automatic mass message processing system.

In the description of FIG. 1, the AMP system 110 was described as processing one failure message in response to one process integration failure between two applications—the first application 102a, the second application 102b. In some implementations, the AMP system 110 can simultaneously process multiple failure messages in an automated manner. To do so, the AMP system 110 implements a function module 200, whose operations are described with reference to FIG. 2. FIG. 2 is a schematic diagram of an example of a system depicting the AMP system 110 including the function module 200. The AMP system 110 can implement the function module 110 either in response to the support system 108 identifying a failure message responsive to a health check or in response to a user of an application requesting a resolution, a process that is described later. For example, an operator of the support system 108 can select a "Find Resolution" object on a user interface (described later) for a health check generated which is for a failing process integration message. In another example, a user of the application which is either the sender application or the receiver application in the process integration can select the "Find Resolution" object. In either example, the "Find Resolution" object is selected because the user has identified a process integration failure resulting in a failure message.

A selection of the "Find Resolution" object in either example triggers a function call to the function module 200. In some implementations, the function module 200 receives information associated with the failure message generated in response to the process integration failure between the two computer-implemented applications. The information includes a sender application/receiver application interface and details that caused the failure, e.g., error messages. For example, the information includes a sender application identifier, a receiver application identifier and a message identifier. FIG. 3 is an example of a function builder table 300 that shows details passed to the function module 200. Each exchange infrastructure (XI) message in the system is uniquely identified with a key, which is shown in the function builder table 300. The function module 200 uses this key as input.

In some implementations, the function module 200 identifies multiple failure messages to the failure message described above. The multiple failure messages were generated in response to the same process integration failure between the two computer-implemented applications. For example, even after a first process integration between applications 102a and 102b failed and a failure message was generated, the applications may have continued to attempt process integration but may have failed. Each failure resulted in a respective failure message. The health check processing system 104 can have identified all such failure messages. The function module 200 identifies such failure messages and implements the resolution class operation for all of the identified messages. In this manner, although the function module 200 received information about only one failure message, the function module 200 searched for and identified other failure messages for the same sender application/receiver application interface and details about the failure, e.g., the same error messages, and the function module 200 triggered the resolution class operation for all the failure messages automatically and simultaneously, thereby processing all the failure messages in a mass enabled way.

To implement the resolution class operation, the function module 200 searches for a resolution class operation which matches the sender application/receiver application interface and the details that caused the failure. To do so, the function module 200 searches a registration table that includes resolution class operations for different applications in the enterprise. FIG. 4 is an example of a registration table 400. One or more or all applications can register a resolution class operation that can be implemented to remedy the process integration failure. Registration table has following information a) Details of sender and receiver application message interface b) Error message in the failed message to be handled via AMP c) Resolution strategy like restart, cancel, raising BTM task etc. If the application has registered a resolution class operation, then the function module 200 triggers, i.e., implements, the resolution class operation to resolve the failure message. The application registers with the registration table after the analysis of failure messages to resolve them automatically for already failed messages and if the failure occurs again in future.

In some implementations, the resolution class operation is an application exit implementation. Depending on the use-case, the function module 200 can write application specific logic in the exit implementation. The application specific exit can implement resolution categories like restart, cancel or reconcile process integration messages. In general, the application specific logic determines the resolution strategy and triggers the class to perform the same for all of the identified failure messages. In some implementations, if the function module 200 does not find application specific logic to resolve the failure message, then the function module 200 identifies a generic resolution operation that is common to all applications and that the function module 200 can implement across all applications to rectify the process integration failure. In response to identifying the generic resolution operation, the function module 200 can execute the identified operation for all of the failure messages. In some implementations, the generic resolution operation is a restart of all the applications. In general, the generic resolution operation is a common implementation applicable to all sender receiver interfaces. If the issue is not addressed by this generic resolution operation, then application specific exit is called. Both the implementations use a super class which has multiple helper methods like Restart, Reconcile, Cancel and an interface to raise BTM tasks.

If the implementation of the resolution class operation was successful, i.e., the process integration failure was remedied, then, the next time the health check processing system 104 performs a health check, it determines that the failure message has been processed and closes the health check incident. In contrast, if the implementation of the resolution class operation was unsuccessful, then the health check processing system 104 notifies the function module 200. The function module 200 can forward the notification to the support system 108 that can attempt to remedy the failure using techniques described above, such techniques involving actions by the product support or application development teams. In some implementations, in response to unsuccessful resolution of the failure message, the function module 200 can forward a notification of the unsuccessful execution of the resolution class operation to the application development team.

In some implementations, the function module 200 triggers the resolution class operation for a threshold number of failure messages, for example, 1000 failure messages, at a time. For example, upon identifying all the related failure messages, the function module 200 determines a number of the related failure messages. If the number is greater than the threshold number of failure messages, then the function module 200 divides all the failure messages into two or more sets, each set including at most the threshold number of failure messages. The function module 200 implements the resolution class operation for all the messages in a first set. After the function module 200 has successfully processed the messages in the first set, the health check processing system 104 closes incidents associated with all the messages. But, the health check processing system 104 also notices that other failure messages remain. In response, the health check processing system 104 opens a new incident for the unprocessed failure messages and forwards the incident to the function module 200. The function module 200 once again implements the techniques described here to resolve the failure messages. This cycle of operations continues until the function module 200 has processed all the failure messages and the health check processing system 104 does not find any unprocessed failure messages. If the registration table does not include any resolution class operation, e.g., because none of the applications registered such an operation, then the manual resolution of failure messages described above is implemented.

In some implementations, a user of the application (e.g., a customer of a business process) can be provided with a user interface in which the user can view failure messages and through which the user can seek resolution of such messages. FIG. 5 is an example of a communication monitoring work center 500. The work center 500 can be implemented as a graphical user interface that can be displayed on a computer monitor or a monitor coupled to a computer system in which the user of an application can find all process integration failure messages associated with the application. By "associated," it is meant that the application was either the sender application or the receiver application in process integration failures that generated the failure messages. In the work center 500, an object 502 (e.g., a selectable button with the text "Find Resolution" or similar message) can be displayed. A selection of the object 502 can trigger a passing of the failure messages to the function module 200. In the scenario described above, the work center 500 and the object 502 are displayed on a computer system operated and controlled by a user of the application. In another scenario, the work center 500 and the object 502 can be displayed by the health check processing system 104. In such a scenario, in response to a user of the health check processing system 104 selecting the object 502, the failure messages identified during the health check can be passed to the function module 200 as described above.

Figure 6:
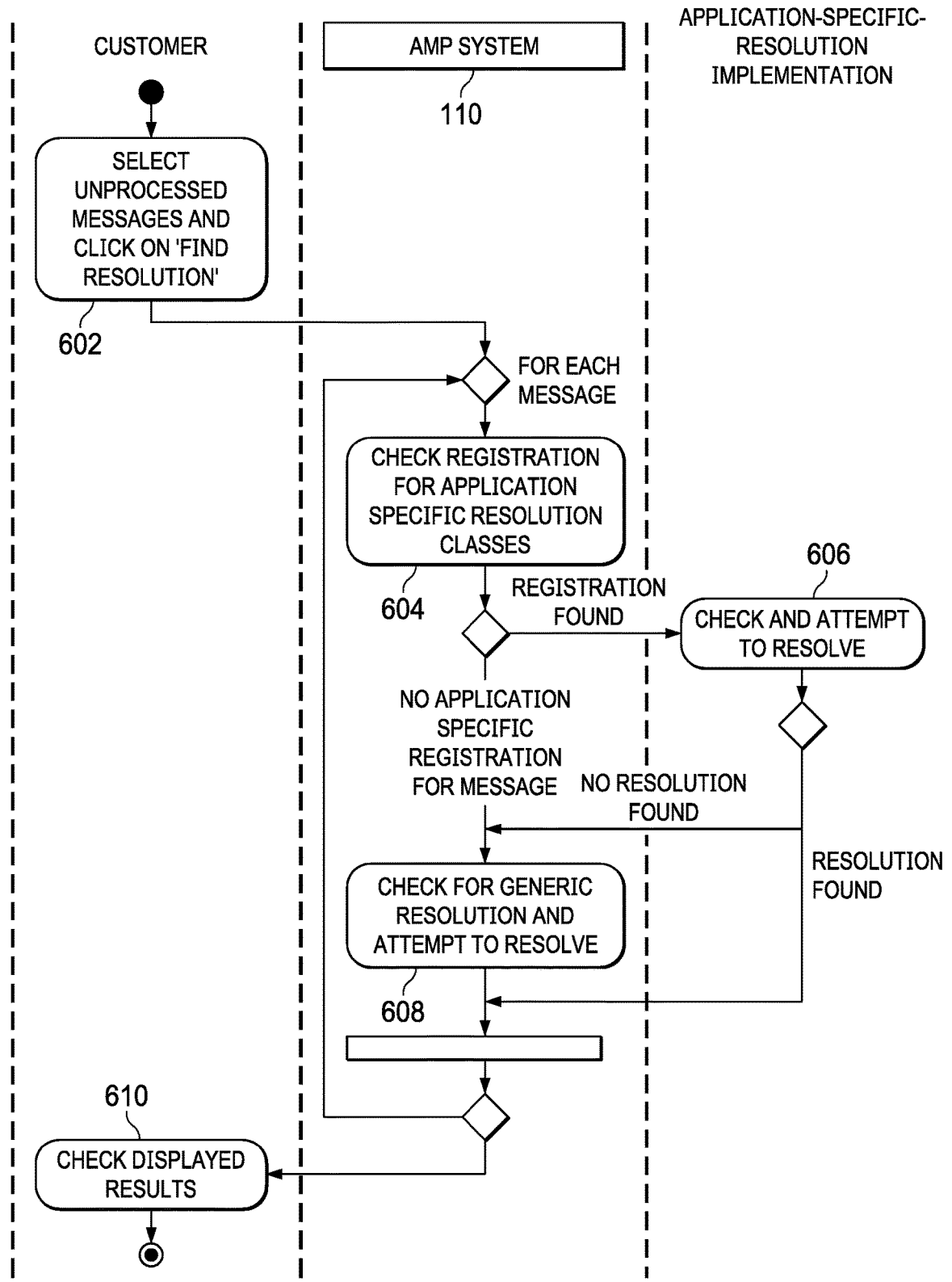
FIG. 6 is a flow diagram of an example of a resolution class operation.

FIG. 6 is a flow diagram of an example of a resolution class operation performed in response to a selection of the object 502. At step 602, a customer, e.g., a user of an application or an operator of the health check processing system 104, selects unprocessed messages from the work center 500 and clicks on the object 502, as described above with reference to FIG. 5. Also, as described above, the selection triggers the function module 200 of the AMP system 110. For each failure message, the AMP system 110 checks the registration table for application specific resolution classes. If the registration is found, then the AMP system 110 implements the application-specific resolution class operation and attempts to resolve the failure. If the resolution is found, then the AMP system 110 transmits a notification of the resolution to the customer. If the application-specific resolution class operation is not found in the registration table or if implementing the application-specific resolution class operation does not resolve the process integration failure, then the AMP system 110 checks for a generic resolution applicable to all applications. If found, the AMP system 110 implements the generic resolution to resolve the process integration failure messages. The AMP 110 transmits a notification of the resolution to the work center 500, which displays the notification to be viewed by the customer. In some implementations, the flow diagram can be implemented by the AMP system 100 to mass resolve multiple, related failure messages as described earlier.

FIG. 7 is a schematic diagram of an example of a cleanup of unprocessed messages via silent data migration. The silent data migration is a framework that allows implementing and registering data migrations that shall be performed during uptime of the application users, thereby minimizing the downtime on the application side. The silent data migration framework minimizes application effort by providing central functionality like package handling, error handling including automatic retry, lock handling, etc. The data migration is implemented as batch jobs on packages performed on a periodic basis, e.g., hourly.

The silent data migration is implemented by the application 702, specifically by teams managing the application 702. The silent data migration is implemented, in part, by an application registration module 704 that executes a cleanup of unprocessed messages. For example, once the application 702 identifies a problem that caused high volume of failure messages, the application registration module 704 can be deployed to clean up the existing failure messages. The AMP framework 706 provides the application registration capability by which all the application registration module 704 can perform all the clean up activities centrally for all use cases from the application 702. The application registration module 704 can implement the clean up registration based on the following parameters: (i) service name: web service for which the clean up is required; (ii) specific tenant information: clean up can be triggered in specific customer tenants; (iii) error details: error details are provided to target failed messages for clean up having specific errors; (iv) duration— (a) date range: a specific start/end date can be provided for the clean up (e.g., all messages falling within a date range), (b) relative duration: a relative duration can be provided for the clean up (e.g., all messages that are a certain number of days old); (v) resolution strategy—the clean up actions include restart, cancel, reconcile or raise BTM task. The AMP framework 706 runs the clean up activity periodically (e.g., every 1 hour), and detects a new application registration, if any. Because the clean up activity may require processing bulk data, the clean up is performed in packets. As part of packaging, the AMP framework 706 keeps a track of overall execution time and stops further processing if the overall execution time exceeds a threshold time, for example, ten minutes. In this manner, the AMP framework 706 restricts clean up operations to the threshold time and schedules remaining processes for the next cycle of clean up operations.

FIG. 8 is a schematic diagram of an example of modularization of automatic message processing. Modularized architecture of the AMP can be implemented as the central component for every application area to ensure that the failure messages are being processed successfully. Modularization of the AMP allows leaving the core logic to be untouched by multiple application areas, which are housed as separate deployment units and interact with each over via messages. Modularization also allows modifying or updating the registration table with new classes to account for changing reasons for process integration failure and failure message generation. In particular, modularization allows such modifications to the registration table without touching the core logic. As shown in FIG. 8, a user 802 or the support system 108 trigger the function module 200, which identifies related failure messages and looks up a registration table for a common resolution operation or a specific one based on configuration. As described above, the registration table stores sender/receiver interface pairs and error codes associated with the failure message. The AMP framework includes multiple, application-specific classes, and a common super class common to all applications. Modularization allows adding new classes or modifying existing classes to simultaneously bulk-process failure messages as described above.

FIG. 9 is a flowchart of an example of a process 900 of automatically processing failed messages. Some or all of the steps of the process 900 can be implemented by the AMP system 110, in particular, the function module 200. At 902, information associated with a failure message is received. The failure message is generated in response to process integration failure between two computer-implemented applications including a sender application and a receiver application. The information includes a sender application/receiver application interface and details that caused the failure. At 904, using the received information, multiple failure messages similar to the failure message are identified. The identified failure messages were generated in response to the same process integration failure between the two computer-implemented applications. At 906, for either the sender or the receiver application, a resolution class operation executable to rectify the process integration failure. At 908, the resolution class operation is simultaneously executed for all of the plurality of failure messages.

The preceding figures and accompanying description illustrate example processes and computer-implementable techniques. But system 100 (or its software or other components) contemplates using, implementing, or executing any suitable technique for performing these and other tasks. It will be understood that these processes are for illustration purposes only and that the described or similar techniques may be performed at any appropriate time, including concurrently, individually, or in combination. In addition, many of the operations in these processes may take place simultaneously, concurrently, and/or in different orders than as shown. Moreover, system 100 may use processes with additional operations, fewer operations, and/or different operations, so long as the methods remain appropriate.

In other words, although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

The invention claimed is:

1. A computer-implemented method comprising:
receiving information associated with a failure message generated in response to process integration failure between two computer-implemented applications including a sender application and a receiver application, the information including a sender application/receiver application interface and details that caused the failure;
using the received information:
identifying a plurality of failure messages similar to the failure message, wherein the identified plurality of failure messages were generated in response to the same process integration failures in response to process integration attempts between the two computer-implemented applications, identifying, for either the sender or the receiver application, a resolution class operation executable to rectify the process integration failure, and executing, simultaneously for all of the plurality of failure messages, the resolution class operation; and after executing, simultaneously for all of the plurality of failure messages, the resolution class operation:

determining that execution of the resolution class operation was unsuccessful; and in response to determining that execution of the resolution class operation was unsuccessful, forwarding a notification of the unsuccessful execution to an application development team.

2. The method of claim 1, wherein the resolution class operation is an application exit operation, wherein identifying, for either the sender or the receiver application, the resolution class operation comprises looking up a registration table for the application exit operation registered by either the sender or the receiver application, and wherein executing, simultaneously for all of the plurality of failure messages, the application exit operation comprises:

identifying the application exit operation in the registration table; and triggering the application exit operation simultaneously for all of the plurality of failure messages.

3. The method of claim 1, further comprising:

searching for the resolution class operation for either the sender or the receiver application; and in response to not finding the resolution class operation for either the sender or the receiver application:

identifying a generic resolution operation common to all applications, the generic resolution executable to rectify the process integration failure, and executing, simultaneously for all of the plurality of failure messages, the generic resolution operation.

4. The method of claim 3, wherein the generic resolution is a restart of all the applications.

5. The method of claim 1, wherein the resolution class operation is a restart of either the sender or receiver applications.

6. The method of claim 1, wherein receiving the information associated with the failure message comprises:

displaying, in a user interface, an object selectable to transmit the information;

displaying, in the user interface, a message identifier identifying the failure message; and detecting a selection of the message identifier followed by a selection of the object.

7. The method of claim 1, wherein the information associated with the process integration failure includes a sender application identifier, a receiver application identifier and a message identifier.

8. The method of claim 1, further comprising:

determining that a number of the plurality of failure messages exceeds a threshold number of failure messages for which the resolution class operation is simultaneously executable;

in response determining that the number of the plurality of failure messages exceeds the threshold number:

identifying, from among the plurality of failure messages, a subset, wherein a number of failure messages in the subset equals the threshold number of failure messages;

executing, simultaneously for all of the failure messages in the subset and in a first operation execution cycle, the resolution class operation; and executing, simultaneously for all of the failure messages in a remainder of the plurality of failure messages and in a subsequent operation execution cycle, the resolution class operation.

9. A system comprising:

one or more computers; and a computer-readable medium coupled to the one or more computers having instructions stored thereon which, when executed by the one or more computers, cause the one or more computers to perform operations comprising:

receiving information associated with a failure message generated in response to process integration failure between two computer-implemented applications including a sender application and a receiver application, the information including a sender application/receiver application interface and details that caused the failure;

using the received information:

identifying a plurality of failure messages similar to the failure message, wherein the identified plurality of failure messages were generated in response to the same process integration failures in response to process integration attempts between the two computer-implemented applications, identifying, for either the sender or the receiver application, a resolution class operation executable to rectify the process integration failure, and executing, simultaneously for all of the plurality of failure messages, the resolution class operation; and after executing, simultaneously for all of the plurality of failure messages, the resolution class operation:

determining that execution of the resolution class operation was unsuccessful; and in response to determining that execution of the resolution class operation was unsuccessful, forwarding a notification of the unsuccessful execution to an application development team.

10. The system of claim 9, wherein the resolution class operation is an application exit operation, wherein identifying, for either the sender or the receiver application, the resolution class operation comprises looking up a registration table for the application exit operation registered by either the sender or the receiver application, and wherein executing, simultaneously for all of the plurality of failure messages, the application exit operation comprises:

identifying the application exit operation in the registration table; and triggering the application exit operation simultaneously for all of the plurality of failure messages.

11. The system of claim 9, wherein the operations further comprise:

searching for the resolution class operation for either the sender or the receiver application; and in response to not finding the resolution class operation for either the sender or the receiver application:

identifying a generic resolution operation common to all applications, the generic resolution executable to rectify the process integration failure, and executing, simultaneously for all of the plurality of failure messages, the generic resolution operation.

12. The system of claim 11, wherein the generic resolution is a restart of all the applications.

13. The system of claim 9, wherein the resolution class operation is a restart of either the sender or receiver applications.

14. A computer program product encoded on a non-transitory storage medium, the product comprising non-transitory, computer readable instructions for causing one or more processors to perform operations comprising:

receiving information associated with a failure message generated in response to process integration failure between two computer-implemented applications including a sender application and a receiver application, the information including a sender application/receiver application interface and details that caused the failure;

using the received information:

identifying a plurality of failure messages similar to the failure message, wherein the identified plurality of failure messages were generated in response to the same process integration failures in response to process integration attempts between the two computer-implemented applications, identifying, for either the sender or the receiver application, a resolution class operation executable to rectify the process integration failure, and executing, simultaneously for all of the plurality of failure messages, the resolution class operation; and after executing, simultaneously for all of the plurality of failure messages, the resolution class operation:

determining that execution of the resolution class operation was unsuccessful; and in response to determining that execution of the resolution class operation was unsuccessful, forwarding a notification of the unsuccessful execution to an application development team.

15. The computer program product of claim 14, wherein receiving the information associated with the failure message comprises:

displaying, in a user interface, an object selectable to transmit the information;

displaying, in the user interface, a message identifier identifying the failure message; and detecting a selection of the message identifier followed by a selection of the object.

16. The computer program product of claim 14, wherein the information associated with the process integration failure includes a sender application identifier, a receiver application identifier and a message identifier.

17. The computer program product of claim 14, wherein the operations comprise:

determining that a number of the plurality of failure messages exceeds a threshold number of failure messages for which the resolution class operation is simultaneously executable;

in response determining that the number of the plurality of failure messages exceeds the threshold number:

identifying, from among the plurality of failure messages, a subset, wherein a number of failure messages in the subset equals the threshold number of failure messages;

executing, simultaneously for all of the failure messages in the subset and in a first operation execution cycle, the resolution class operation; and executing, simultaneously for all of the failure messages in a remainder of the plurality of failure messages and in a subsequent operation execution cycle, the resolution class operation.

18. The computer program product of claim 14, wherein the resolution class operation is an application exit operation, wherein identifying, for either the sender or the receiver application, the resolution class operation comprises looking up a registration table for the application exit operation registered by either the sender or the receiver application, and wherein executing, simultaneously for all of the plurality of failure messages, the application exit operation comprises:

identifying the application exit operation in the registration table; and triggering the application exit operation simultaneously for all of the plurality of failure messages.

\* \* \* \* \*